United States Patent [19]
Zankowski

[11] 3,800,533
[45] Apr. 2, 1974

[54] APPARATUS AND METHOD FOR REDUCING HARMFUL PRODUCTS OF COMBUSTION

[75] Inventor: Arthur Zankowski, Fayetteville, N.Y.

[73] Assignee: Azapco, Inc., Fayetteville, N.Y.

[22] Filed: June 13, 1972

[21] Appl. No.: 262,253

[52] U.S. Cl................ 60/274, 60/278, 123/34 A, 123/119 A, 123/134
[51] Int. Cl................ F02b 75/10, F02m 25/06
[58] Field of Search............ 60/274, 278, 320, 321, 60/281; 123/120, 122 E, 119 A, 34 A, 35, 134

[56] References Cited
UNITED STATES PATENTS

| | | | |
|---|---|---|---|
| 2,071,116 | 2/1937 | French | 60/278 |
| 2,312,151 | 2/1943 | Crabtree | 123/119 A |
| 2,430,852 | 11/1947 | Allen | 123/119 A |
| 2,851,021 | 9/1958 | Covone | 123/119 A |
| 2,956,559 | 10/1960 | Johnson | 123/119 A |
| 3,241,536 | 3/1966 | Falzone | 60/278 |
| 3,247,666 | 4/1966 | Behrens | 60/302 |
| 3,413,803 | 12/1968 | Rosenlund | 60/274 |
| 3,421,485 | 1/1969 | Fessenden | 123/119 A |
| 3,450,116 | 6/1969 | Knight | 123/119 A |
| 3,530,843 | 9/1970 | Fessenden | 123/119 A |

*Primary Examiner*—Douglas Hart
*Attorney, Agent, or Firm*—Charles S. McGuire

[57] ABSTRACT

An apparatus and method for effecting combustion of a volatile liquid fuel in a manner which significantly reduces harmful products of such combustion, such as carbon monoxide and oxides of nitrogen. The invention is particularly applicable to, and is described in connection with, a conventional internal combustion engine. The fuel is fully vaporized, and the vapors mixed with air, before being burned. The combustion gases are then oxidized without further combustion and divided by a flow-limiting orifice and branch line into two portions, one of which is released to the atmosphere, and the other returned to the system by being released through a nozzle below the surface of the liquid fuel being vaporized. The temperature of the returned gas is below the boiling range of the liquid fuel.

12 Claims, 3 Drawing Figures

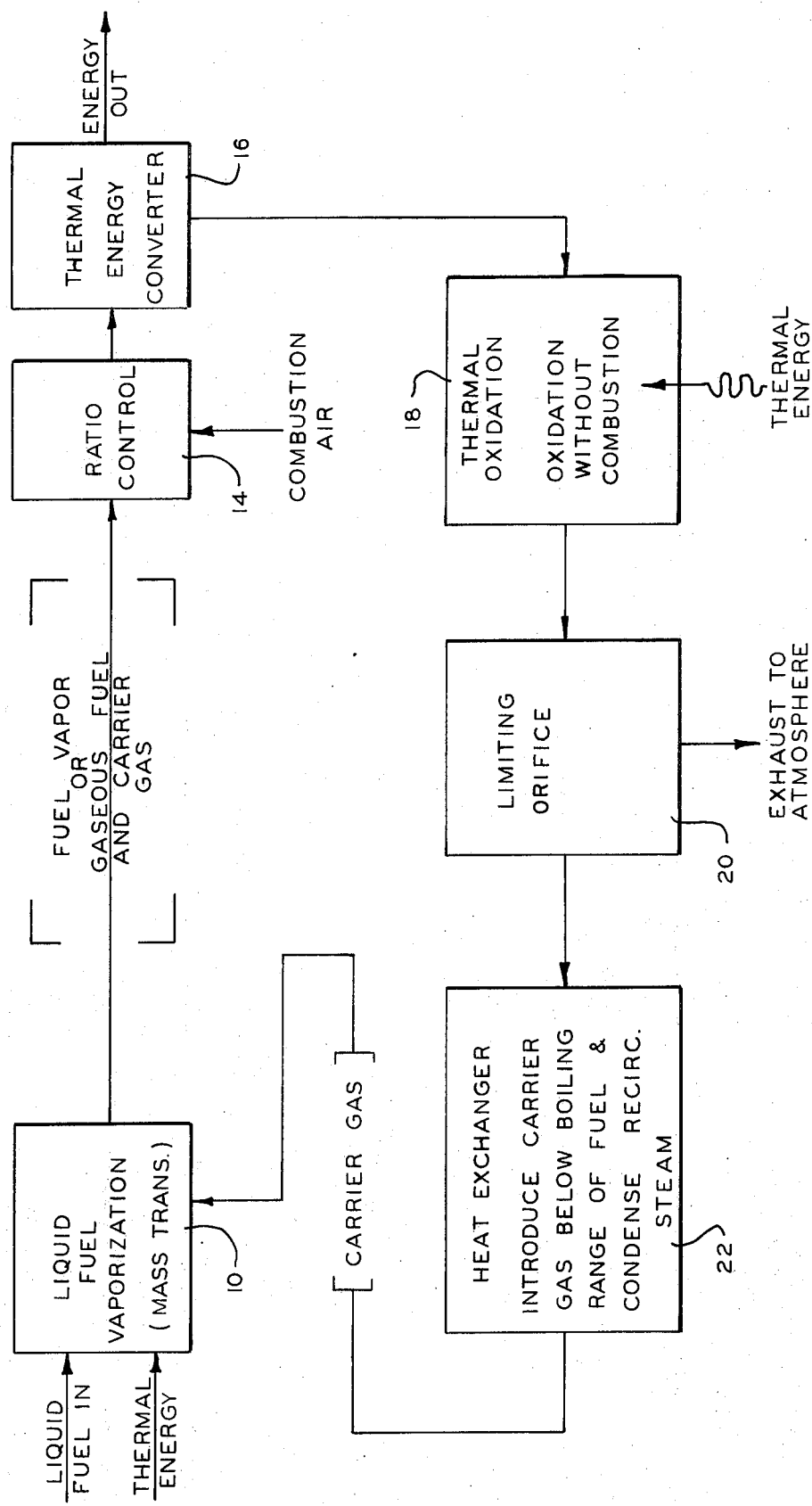

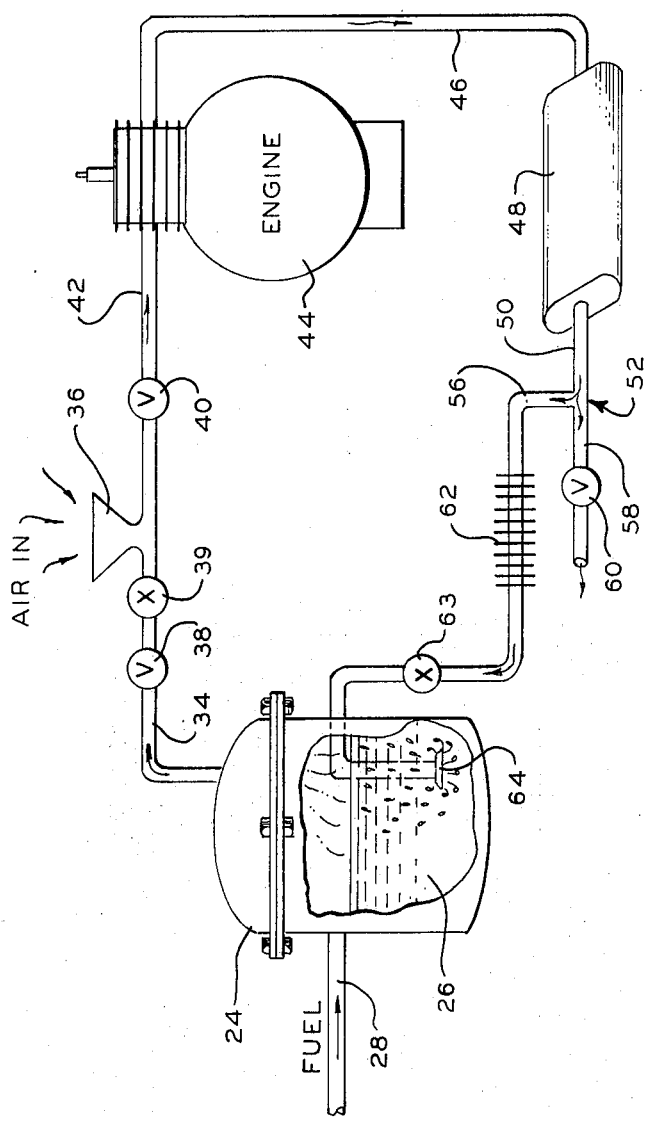
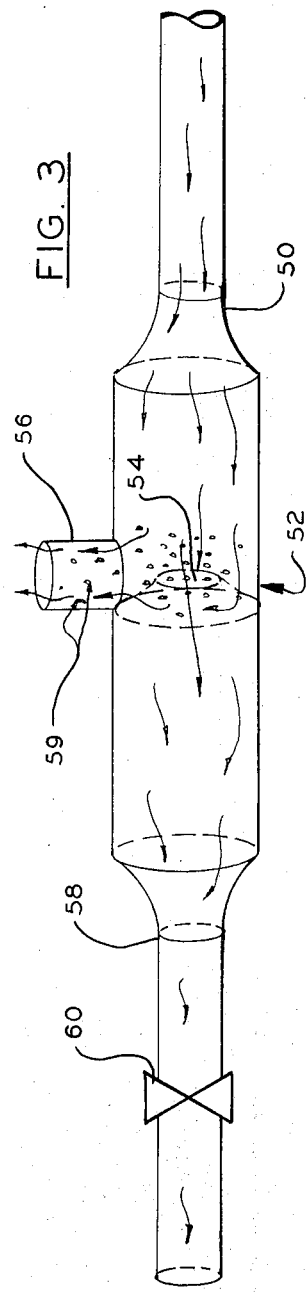

APPARATUS AND METHOD FOR REDUCING HARMFUL PRODUCTS OF COMBUSTION

BACKGROUND OF THE INVENTION

The present invention relates to abatement of harmful products of combustion and, more particularly, to methods and apparatus for burning fuels such as hydrocarbons without accompanying emissions of air pollutants in significant quantities.

Hydrocarbon compounds are among the most common thermal energy conversion means in present day use. Of particular significance is the use of various petroleum products, notably commercial grade gasoline, as virtually the only acceptable fuel for internal combustion engines. The exhaust gases emitted from gasoline engines contain, essentially without exception, carbon monoxide, oxides of nitrogen and unburned hydrocarbons. The concentration of such pollutants in some locations is already a hazard to life, and the problem is becoming more widespread daily.

Numerous approaches to the problem of finding a practical engine which produces acceptably low quantities of harmful combustion products have been explored. These include developments in the field of external combustion (steam) engines, filtration of exhaust gases, catalytic reaction to change the chemical composition of combustion products, use of special fuels, and others. For various reasons, none has proven acceptable to the point of commercial use on a scale which would noticeably improve the present situation. For economic reasons it is desirable to continue the use of the basic internal combustion engine, fueled by commercial grade gasoline with such additives as are necessary to optimize engine performance. However, as such engines now operate, they will exceed legally permissible limits for maximum quantities of harmful exhaust emissions now scheduled to take effect at a future date. That is, no acceptable system now exists which will meet standards established by law as necessary to avoid irreparable harm to the environment.

It is the principal object of the present invention to provide such a system.

BRIEF SUMMARY OF THE INVENTION

The invention provides a thermal energy converter, i.e., a means of burning fuel to produce energy, which may conveniently take the form of an ordinary internal combustion engine running on conventional fuel such as commerical grade gasoline. The fuel charge is in vaporized form, comprising gaseous hydrocarbon fractions mixed with air or other suitable carrier gas, and is provided directly to the engine fuel intake without need for carburetion or atomization as with liquid fuels. The vapors are taken from an enclosed vessel containing a continually replenished supply of the fuel in liquid form.

The engine exhaust is discharged into a thermal reactor wherein carbon monoxide in the exhaust is oxidized without further combustion. That is, an oxygen atom is added to convert the poisonous carbon monoxide molecules to harmless carbon dioxide, but without burning in the usual sense, as in an afterburner. The thermal reactor may comprise nothing more than an enclosure for the exhaust gases, of sufficient capacity relative to the volume of exhaust per unit of time that the gas remains within the enclosure for a sufficient time to allow thermal oxidation of the carbon monoxide. The residence time of the gases within the enclosure will remain within the range of the body velocity of such gases required to accomplish optimum thermal oxidation.

After exiting from the thermal reactor the exhaust gas flow is divided so that a portion is released to the atmosphere and a portion is returned to the vessel holding the liquid fuel being vaporized and provided to the engine intake. In the disclosed embodiment this is accomplished by placing a flow restricting orifice in the exhaust line adjacent to a branch line leading back to the fuel vessel. Water vapor in the exhaust gas is condensed before the gas is returned to the fuel vessel.

Depending on the temperature at which the system is operated, a heat exchanger may be provided in the line through which a portion of the exhaust gas is returned to the fuel vessel. That is, the portion of the exhaust returned to the fuel vessel must be at a temperature below the boiling range of the liquid fuel therein. In some applications the exhaust gas temperature and fuel boiling range will be in such relation that the heat exchanger may be omitted, and in still other cases it may be desirable to add heat to the exhaust gas before returning it to the fuel vessel.

The line carrying the return exhaust gas carries a nozzle or head with several small apertures arranged below the surface of the liquid fuel within the vessel. Thus, the exhaust gas is bubbled into the liquid fuel and rises to the surface. As the bubbles pass through the liquid some unburned hydrocarbons are absorbed in the liquid. The liquid fuel is vaporized as a function of heat and pressure differential across the enclosed vessel, and mixed with air to support combustion in the engine.

The net effect is an emitted exhaust gas comprising largely carbon dioxide and water vapor, with concentrations of carbon monoxide, oxides of nitrogen and unburned hydrocarbons far below the established acceptable limits.

BRIEF DESCRIPTION OF THE FIGURES

FIG. 1 is a block diagram in the nature of a process or flow diagram illustrating the operation of the system;

FIG. 2 is a somewhat diagrammatic showing of a preferred embodiment of the operative elements of the system; and FIG. 3 is an enlarged, fragmentary, perspective view of a portion of FIG. 2.

DETAILED DESCRIPTION

The invention will be described in the context of a conventional internal combustion engine, although it will be readily apparent to those skilled in the art that the principles embodied in the following disclosure may be readily employed in a wide variety of applications. Also, the fuel burned in the engine is assumed to be a liquid hydrocarbon such as standard, commercial grade gasoline, but many volatile liquid fuels are equally suitable and the invention is not intended to be employed solely with any specific fuel. The physical size and configuration of the elements described will also be subject to wide variation, as will the incorporation in or with the individual elements of ancillary equipment, controls, etc.

Referring now to FIG. 1, block 10 represents the step of vaporizing a volatile liquid fuel supplied from a storage tank, reservoir, or other appropriate source. The fuel may be vaporized by applying heat and/or pressure differential in conventional fashion. Relatively low temperatures or pressure differentials are normally sufficient to produce vaporization at the necessary rate, as discussed later in more detail. Vaporization may be effected or aided by returning to the vaporizing unit a portion of the exhaust gases from the engine, after the latter has begun running to produce such gases.

In the process of being vaporized the fuel is mixed with a diluent carrier gas, all or part of which may be provided by the returned or recycled exhaust gases. The fuel vapor-carrier gas mixture is next mixed with air to support combustion of the fuel. Combustion air is taken in from the atmosphere at ambient temperature to provide a desired, selectively variable ratio of the fuel charge. Block 14 indicates the ratio control of combustion air addition to the fuel vapor-carrier gas mixture.

The gaseous fuel charge is then burned to produce useable energy in what may be broadly termed a thermal energy converter, indicated by block 16. This may take a number of forms, including virtually all known apparatus for effecting combustion of a fuel of the character described with a contained exhaust. That is, the products of combustion are not immediately released to the atmosphere, but instead are contained within an enclosed system wherein further processing of the combustion products may be performed. One common form of thermal energy converter wherein the invention is employed is an ordinary internal combustion engine, either reciprocating or rotary piston. For purposes of the present disclosure, as previously mentioned, it is assumed that thermal energy conversion takes place in an internal combustion engine conventional in all respects from intake to exhaust.

The products of combustion, after leaving the thermal energy converter, are oxidized without further combustion, as indicated by block 18. Thermal oxidation, converting carbon monoxide in the exhaust to carbon dioxide, takes place by containing the exhaust gas for a sufficient period of time to allow the heat of the exhaust gases coupled with the presence of oxygen to effect such oxidation. It is important to note, however, that thermal oxidation does not take place by "afterburning" the combustion products. Although afterburners may be effective in reducing concentrations of carbon monoxide, they increase the equally or more harmful oxides of nitrogen. The oxidation without combustion contemplated by the present invention takes place at a low enough temperature that oxides of nitrogen in significant quantities are not formed.

After undergoing thermal oxidation the exhaust gases are diverted into two paths. As indicated by block 20, a first portion is released to the atmosphere and a second portion is returned to the process to serve as the carrier gas for the fuel vapor. A limiting orifice is placed in the path of the gas to be released to the atmosphere and the returned portion is diverted through another line back to the fuel vaporization unit. The structure and arrangement of the limiting orifice and flow diverting means, discussed later in more detail, is preferably such that relatively high proportions of the exhaust gases, e.g., within the range of 50 to 75 percent by volume, are returned to the process after being thermally oxidized.

The portion of the exhaust gas which is retained in the system must be at a temperature below the boiling range of the fuel before being mixed therewith. Furthermore, it is necessary to condense water vapor carried in the retained gas before mixing it with the fuel. The gas is therefore cooled either by expansion, or by separate heat exchanger means, or a combination thereof, before being returned to the fuel source. Block 22 indicates any necessary heat exchange which takes place between the division of the exhaust gases into released and recycled portions and the mixing of the recycled portion with the vapors from the liquid fuel.

Turning now to FIG. 2, there is shown an embodiment of apparatus incorporating the invention. The apparatus of FIG. 2 is more of a laboratory than a commercial nature, since the practical applications of the invention are widely varied. Enclosed vessel 24 holds a quantity of volatile liquid fuel 26, e.g., commercial grade gasoline. Fuel line 28 extends into vessel 24 from a gasoline tank or other supply source (not shown) for continually replenishing the liquid fuel pump in conventional fashion. Fuel 26 is converted from liquid to vaporized form and leaves vessel 24 through line 34. Flow is initiated by creating a temperature pressure combination within vessel 24 which results in vaporization of at least the more volatile fractions of the particular fuel being used. In many cases, it is sufficient to initiate operation that the fuel be provided at ambient temperature and a pressure differential created within vessel 24 by turning over the engine, for example, with an electric starter. After initial operation, vaporization is aided by returning a portion of the exhaust gases to vessel 24, as mentioned earlier and explained in more detail later herein.

Line 34 carries the fuel vapors from vessel 24 to air intake 36 where the vapors are mixed with combustion-supporting air. Valve 38 in line 34 is provided to regulate flow of fuel vapors from vessel 24 to air intake 36, by controlling pressure differential. One-way check valve 39 is provided to permit flow in only one direction. Valve 40 is provided in line 42 to control the fuel-air mixture ratio. Line 42 leads directly to the intake manifold of engine 44, an internal combustion engine of conventional design. Since the fuel is in a fully vaporized state before being mixed with the intake air, no carburetor or other fuel atomizing device is required. The fuel charge is burned in engine 44 to produce thermal energy which is converted in the usual manner to mechanical energy output of the engine. Since the fuel charge comprises hydrocarbon vapors mixed with relatively high proportions of diluent carrier gases, additives such as tetralkyl lead, and the like, are not required to achieve proper combustion.

The exhaust manifold of engine 44 is connected by line 46 to thermal reactor 48. This may be nothing more than an enclosure adjacent the combustion chamber through which the products of combustion must pass and wherein the heat of the exhaust, coupled with the time of containment of the gases, causes oxidation of the carbon monoxide in the exhaust gas.

In order to utilize the heat of the exhaust gases to maximum advantage in achieving thermal oxidation it is preferred that reactor 48 be placed closely adjacent the exhaust manifold.

From reactor 48 the exhaust gases pass through line 50 to flow limiting and diverting means 52. A suitable example of such means is shown in FIG. 3. The diameter of line 50 is enlarged somewhat a short distance from flow restricting orifice 54. Immediately above orifices 54, line 56 branches from line 50 and is of the same diameter as line 50 prior to the enlargement. The structure defining orifice 54 is within the enlarged diameter portion of the line, the diameter being again reduced on the opposite side of the orifice with line 58 corresponding in diameter to line 50.

The water vapor in the exhaust gases will tend to condense upon being expanded and cooled at flow directing means 52. Water droplets, indicated generally in FIG. 3 by reference numeral 59, may form within the portion of the line near orifice 54. Water vapor is also condensed to liquid water in heat exchanger 62, which may comprise simply a portion of the tube with fins to dissipate the heat to the surrounding atmosphere. The amount of heat removed by the heat exchanger is that required to lower the temperature the gas below the boiling range of fuel 26. Liquid water formed in the process may be removed by an appropriate drain or valve (now shown) and/or allowed to fall into the chamber adjacent orifice 54 and flash vaporized by the heat of the gas passing through the orifice, or carried along with such gas without being again completely vaporized.

The portion of the gas passing through orifice 54 is released to the atmosphere. The volumetric proportions of the gas released and that returned to the system may be established in a desired fixed relationship by the selected diameters of orifice 54 and line 56. Alternatively, and preferably in most applications, means may be provided for selectively varying the proportions of released and recirculated exhaust gases. Such means may conveniently take the form of a variable orifice in the exhaust line, either by making the area of orifice 54 variable or providing a separate selective flow control device such as valve 60.

The recirculated portion of the exhaust gas is returned to vessel 24 through one-way check valve 63, being discharged through nozzle 64 below the surface of fuel 26. Nozzle 64 preferably has a plurality of small apertures, whereby the gases are released in the form of small bubbles, to impinge upon and rise to the surface of liquid fuel 26. The increased gas-liquid surface contact achieved by releasing the gas from small, rather than large, apertures increased the efficiency of absorption of hydrocarbons by the liquid fuel from the exhaust gas. As the gas bubbles pass through the liquid fuel, vaporization concurrently occurs. The unburned hydrocarbons in the exhaust gas are thereby recycled for burning in future passes through the engine. Thus, all or most of the gas released to the atmosphere has passed through the engine more than once, and perhaps many times, thereby significantly reducing the content of unburned hydrocarbons in the released exhaust gases.

What is claimed is:

1. A volatile liquid fuel combustion system for substantially reducing harmful products of combustion, said system comprising, in combination:
   a. an enclosed vessel containing a quantity of volatile liquid fuel;
   b. means for extracting vapors from said fuel and mixing said vapors with combustion supporting gas;
   c. thermal energy conversion means wherein the fuel vapor-gas mixture is burned;
   d. a thermal reactor into which products of combustion from said conversion means are discharged for oxidation of carbon monoxide without further combustion;
   e. flow limiting means interposed in the path of exhaust from said thermal reactor for discharging a first portion of said exhaust to the atmosphere and returning a second portion to said enclosed vessel; and
   f. means for discharging said second portion at a temperature below the boiling range of the liquid fuel, into said vessel below the surface of the liquid fuel therein.

2. The invention according to claim 1 wherein said combustion supporting gas is air and said means for mixing comprises ratio control means for selectively controlling the relative amounts of fuel vapors and air.

3. The invention according to claim 2 wherein said thermal energy conversion means comprises an internal combustion engine.

4. The invention according to claim 3 wherein said thermal reactor comprises an enclosure for receiving the exhaust gases of said engine and of sufficient capacity relative to the temperature and body velocity of said gases to effect substantially complete oxidation of carbon monoxide therein as the gases pass through said enclosure.

5. The invention according to claim 1 wherein an exhaust line extends from said thermal reactor and said flow limiting means comprises an orifice of smaller area than said exhaust line interposed therein, and a branch line extending from said exhaust line to said discharging means to carry the portion of the exhaust gas which cannot pass through said orifice back to said vessel.

6. The invention according to claim 5 and further including heat exchanger means in said branch line for reducing the temperature of the gas passing therethrough.

7. The invention according to claim 5 and further including a one-way check valve in said branch line allowing flow therethrough only toward said vessel.

8. The invention according to claim 5 wherein said orifice is positioned directly below the connection of said branch line with said exhaust line, whereby a portion of the water condensed in said branch line drops over said orifice and is flash vaporized.

9. The invention according to claim 1 wherein said discharge means comprises a nozzle having a plurality of small apertures and arranged on the end of a line carrying said second portion of said exhaust back to said vessel.

10. The invention according to claim 1 and further including a line for carrying said vapors out of said vessel and a one-way check valve interposed therein.

11. A method of operating an internal combustion engine fueled with an initially liquid, volatile fuel, said method comprising:
   a. vaporizing a quantity of said fuel;
   b. mixing air with the fuel vapors;
   c. burning the fuel vapor-air mixture in an internal combustion engine cylinder;
   d. oxidizing the carbon monoxide in the exhaust gas from said engine without further combustion thereof;
   e. dividing the flow of said exhaust gas into first and second portions;
   f. releasing said first portion to the atmosphere;

g. reducing the temperature of said second portion below the boiling point of said liquid fuel; and h. discharging said second portion below the surface of said liquid fuel.

12. The invention according to claim 11 and further including expanding the volume said gas just prior to division thereof into said first and second portions.

* * * * *